(12) United States Patent
Peairs

(10) Patent No.: US 6,182,090 B1
(45) Date of Patent: *Jan. 30, 2001

(54) METHOD AND APPARATUS FOR POINTING TO DOCUMENTS ELECTRONICALLY USING FEATURES EXTRACTED FROM A SCANNED ICON REPRESENTING A DESTINATION

(75) Inventor: Mark Peairs, Menlo Park, CA (US)

(73) Assignee: Ricoh Company, Ltd. (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/825,947

(22) Filed: Mar. 31, 1997

Related U.S. Application Data

(62) Division of application No. 08/431,059, filed on Apr. 28, 1995, now Pat. No. 5,717,940.

(51) Int. Cl.[7] .................................................... G06F 17/30
(52) U.S. Cl. ................................ 707/500; 707/6; 345/348
(58) Field of Search .................................... 707/500, 505, 707/530, 3–6; 345/348, 349, 350, 351; 382/305, 306, 181, 190, 173; 358/402

(56) References Cited

U.S. PATENT DOCUMENTS

| Re. 33,316 | 8/1990 | Katsuta et al. .................. 345/428 |
| 4,273,440 | 6/1981 | Frossel ............................ 355/40 |
| 4,574,395 | 3/1986 | Kato ................................ 382/306 |
| 4,716,404 * | 12/1987 | Tabata et al. .................... 345/434 |
| 4,808,987 | 2/1989 | Takeda et al. ................... 345/115 |
| 4,829,453 * | 5/1989 | Katsuta et al. .................. 382/305 |
| 4,965,558 | 10/1990 | Saki et al. ...................... 345/156 |
| 5,083,214 | 1/1992 | Knowles .......................... 358/403 |
| 5,129,011 | 7/1992 | Nishikawa et al. ............. 382/173 |
| 5,140,678 | 8/1992 | Torres . |
| 5,179,652 * | 1/1993 | Rozmanith et al. ............. 345/331 |
| 5,202,828 * | 4/1993 | Vertelney et al. ............... 707/530 |
| 5,220,648 * | 6/1993 | Sato .................................. 707/3 |
| 5,313,572 | 5/1994 | Yamamoto et al. ............. 358/403 |
| 5,383,029 | 1/1995 | Kojima ............................ 358/403 |
| 5,418,946 | 5/1995 | Mori ................................ 707/1 |
| 5,436,639 | 7/1995 | Arai et al. ....................... 345/156 |

(List continued on next page.)

FOREIGN PATENT DOCUMENTS 0 568 161 A1   11/1993   (EP) .

OTHER PUBLICATIONS

Yamamoto et al., "Extraction of Object Features from Image and Its Application to Image Retrieval", 9th Intl. Conf. on Pattern Recognition, vol. 2, pp. 988–991, Nov. 1988.*

(List continued on next page.)

Primary Examiner—Joseph H. Feild
(74) Attorney, Agent, or Firm—Philip H. Albert; Townsend and Townsend and Crew LLP

(57) ABSTRACT

An example page taken from each document in a document database is processed by a page processor to yield an iconic representation for the example page. To form the iconic representation, the example page is segmented into text regions, line art regions, photograph regions, etc., and each region is reduced in a manner appropriate for that image type. Text is replaced with a block font and reduced, while graphics are reduced in level and/or spatial resolution. The reduced regions of the example page are then reassembled into the icon. When multiple icons are printed on a guide page, a user can visually identify the icon for an example page of a target document and supply the icon, or a label for the icon, to a document retrieval system, which selects candidate matching documents from the document database. For simplified processing, characters can be blocked and words formed into solid line segments with lengths proportional to word lengths.

7 Claims, 7 Drawing Sheets

U.S. PATENT DOCUMENTS

| | | | |
|---|---|---|---|
| 5,442,795 | 8/1995 | Levine et al. . | |
| 5,448,375 | 9/1995 | Cooper et al. | 358/403 |
| 5,465,327 | 11/1995 | Wang et al. | 345/329 |
| 5,465,353 | 11/1995 | Hull et al. | 707/5 |
| 5,486,686 * | 1/1996 | Zdybel, Jr. et al. | 235/375 |
| 5,490,217 | 2/1996 | Wang et al. | 380/51 |
| 5,495,581 * | 2/1996 | Tsai | 707/526 |
| 5,517,605 | 5/1996 | Wolf . | |
| 5,680,223 * | 10/1997 | Cooper et al. | 358/403 |
| 5,682,540 * | 10/1997 | Klotz, Jr. et al. | 707/505 |
| 5,717,940 * | 2/1998 | Peairs | 707/515 |
| 5,745,610 * | 4/1998 | Johnson | 382/309 |
| 5,751,286 * | 5/1998 | Barber et al. | 345/348 |

OTHER PUBLICATIONS

Wellner, "DigitalDesk", Comm. of the ACM, v. 36, n. 7, pp. 87–96, Jul. 1993.*

Wellner, "The DigitalDesk Calculator: Tangible Manipulation on a Desktop Display", UIST '91, pp. 27–33, Nov. 1991.*

Johnson et al., "Bridging the Paper and Electronic Worlds: The Paper User Interface", Interchi '93, pp. 507–512, Apr. 1993.*

R. Harper, et al., "Collaborative Tools and the Practicalities of Professional Work at the International Monetary Fund," CHI '95 Home Page (http://www.acm.org/sigchi/chi95/Electronic/documnts/papers/rh_bdy.htm), Conference on Human Factors in Computing Systems, Denver, Colorado (May 7–11, 1995).

S. Whittaker, et al., "Back to the Future: Pen and Paper Technology Supports Complex Group Coordination," CHI '95 Home Page (http://www.acm.org/sigchi/chi95/Electronic/documnts/papers/sjw_bdy.htm), Conference on Human Factors in Computing Systems, Denver, Colorado (May 7–11, 1995).

J. Cullen, et al., "Weak Model–Dependent Page Segmentation and Skew Correction for Processing Document Images," IEEE 1993 (0–8186–4960–7/93), pp. 757–760.

A. Csillaghy, et al., "Building Image Icons For Fast Browsing and Classification of Solar Radio Spectrograms," Image Processing, 1994 International Conference, vol. 2, pp. 71–75.

A. Bimbo, et al., "Symbolic Description and Visual Querying of Image Sequences Using Spatio–Temporal Logic," IEEE Transactions on Knowledge and Data Engineering, vol. 7, No. 4, pp. 609–622.

J. Cha, et al., "Browsing Multimedia Objects via Composite Icons," IEEE International Conference on Systems, Man and Cybernetics, vol. 5, pp. 3926–3931.

Newman, William; Wellner, Pierre, "A Desk Supporting Computer–Based Interaction with paper Documents," ACM Conference on Human Factors in Computing Systems (CHI '92) May 3–7, 1992, pp. 587–592.

Rao, Ramana; Card, Stuart K.; Johnson, Walter, Klotz, Leigh; and Trigg, Randall H., "Protofoil: Storing and Finding the Information Worker's Paper Documents in an Electronic File Cabinet," *Human Factors in Computing Systems* (CHI '94), Boston, MA, pp. 180–186.

Story, Guy A.; O'Gorman, Lawrence; Fox, David; Schaper, Louise Levy; and Jagadish, H.V., "The RightPages Image–Based Electronic Library and Browsing,"IEEE, 0018–9162/92/0900–0017, Sep. 1992, pp. 17–26.

* cited by examiner tions, which have made this report possible. Some of the samples and (or) sample data were provided by S. H. Wood (Boise State Univ.), J. O. Davis (Desert Research Inst., Univ. Nevada), Thomas Bateridge (Geoservices West, Missoula, Mont.), James Beget (Univ. Washington), and P. R. Hooper (Washington State Univ.). Instrumental neutron activation analyses (table 82) were performed by Frank Asaro and Helen Michael (Lawrence Berkeley Laboratory).

Those within the USGS who provided samples or information about Mount St. Helens tephra include D. R. Mullineaux, R. B. Waitt, Jr., Daniel Dzurisin, M. P. Doukas, R. P. Hoblitt, and F. K. Miller. Tephra analyses were made by V. G. Mossotti, T. W. Holmes, S. D. Ramage, J. F. Carr, T. L. Fries, and Chris Heropoulos, all USGS. Robert Oscarson made SEM photos of the ash, and Jose Rivera made density separations. Susan Shipley helped with preparation of the manuscript, and Jane Pike and Wendell Duffield improved the manuscript through many helpful suggestions.

ERUPTION OF MAY 18
PROXIMAL TEPHRA

The major air-fall ash units within the proximal area (units A through D; Waitt and Dzurisin, this volume, figs. 354, 357, and 359) differ from each other in petrography and bulk chemical composition. Samples of layer A3 and units B and D (stratigraphic terminology of Waitt and Dzurisin, this volume, figs. 354, 357, and 359) were examined under binocular and petrographic microscopes to determine the proportions of their components. We had difficulty in making modal counts because of the large size variation in each unit. Small particles, for instance, would adhere to larger ones, making grain identifications difficult or impossible. Samples were sieved through a 40-$\mu$m mesh, and the coarser fraction was separated in liquids with densities of 2.5 and 2.8 g/cm³. The resulting three separates of the coarser fraction were

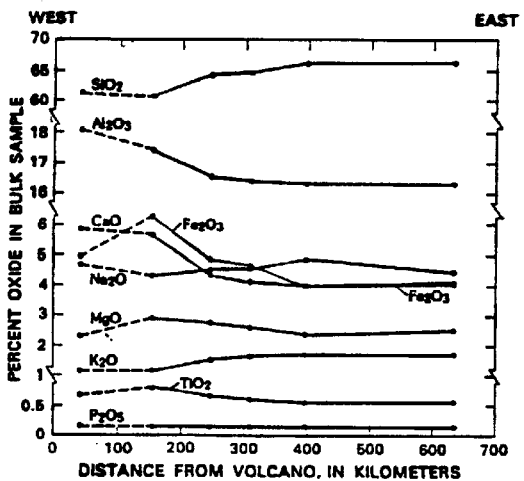

Figure 391.—*Downwind variation in composition of bulk samples of air-fall ash. Dashed lines, trends based on weighted average for four samples from most proximal site. Wavelength-dispersive X-ray fluorescence analyses by V. G. Mossotti, Chris Heropoulos, and J. F. Carr.*

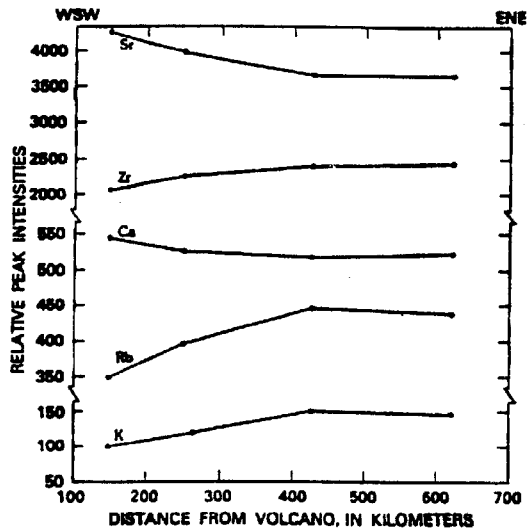

Figure 392.—*Downwind variation of selected elements in bulk samples of air-fall ash. Relative peak intensity based on ratio of counts at peak energy level for each element compared to total counts in spectral region (window) studied. Each dot represents average value for several samples at an average distance from volcano. Energy-dispersive X-ray fluorescence analyses by M. J. Woodward.*

FIG. 3

METHOD AND APPARATUS FOR POINTING TO DOCUMENTS ELECTRONICALLY USING FEATURES EXTRACTED FROM A SCANNED ICON REPRESENTING A DESTINATION

This is a Division of application Ser. No. 08/431,059, filed Apr. 28, 1995, which issued as U.S. Pat. No. 5,717,940 on Feb. 10, 1998.

BACKGROUND OF THE INVENTION

The present invention relates to the field of document storage and retrieval, in particular, the retrieval of a document from a document database using content from an example page taken from the document.

A general approach to the problem of retrieving a target document from document database is to store a set of key words with each document either physically with the document or, more probably, in a lookup table in which the keys are indexed and table entries point to documents in the database. Keys can be easily generated from documents if electronic versions of documents are available. If only paper versions of the documents are available, they can be scanned to form digital images of the pages of the documents and the digital images can be processed by a character recognizer to extract the text of the document and thus the keys. In a more labor-intensive system, the keys can be manually entered.

To retrieve a document, the keys are supplied to a search engine. Where a user is not likely to remember the keys for every document stored in the database, the user can retain an example page from each document as it is stored and supply that example page to a page analyzer for key extraction.

The disadvantage of this general approach is that the documents in the document database and the example pages either need to originate and remain in electronic form, or character recognition would need to be done on example pages to determine the keys. Thus, either the example page needs to be electronic or has to be of sufficient quality that errors do not occur in the scanning and character recognition process.

One example of a prior art system for document presentation is the RightPages document presentation system described in G. Story, "The Right Pages Image-Based Electronic Library for Alerting and Browsing", COMPUTER, Sept. 1992. In that system, a user is presented with a series of journal covers and the user browses the journal covers to find a desired journal, then browses its table of contents and then selects an article from the journal. Once an example page of a journal article is selected, the system retrieves the target article from a document database. The disadvantage to the RightPages system is that the icons are presented on a computer monitor and therefore are lower resolution than print, and the links between the journal covers and the pages must already exist. Thus, the user must be at the computer monitor to browse example pages.

The document storage and retrieval system taught by U.S. Pat. No. 5,465,353 to Hull, et al., entitled "IMAGE MATCHING AND RETRIEVAL BY MULTI-ACCESS REDUNDANT HASHING" (commonly owned by the assignees of the present application, incorporated by reference herein, and hereinafter "Hull") is a system for retrieving a target document from a document database by submitting a paper example page retained from the target document to a search engine. The search engine analyzes the example page and determines likely matches among the documents in the database. Where many, documents are to be stored however, storage and organization of the example pages raises some of the same problems that document database storage tries to alleviate, such as having to allocate storage space for paper pages and keeping them organized.

Thus, what is needed is a system for efficiently storing example pages for use in document retrieval and document management.

SUMMARY OF THE INVENTION

An improved document server is provided by virtue of the present invention. A document server is a computer system which maintains a database of documents, either in a structured form such as editable computer files, as digitized images of paper pages from the documents, or a combination of both. A target document is a document in the document database whose retrieval is desired. To retrieve the document, an input is provided to the document server indicating one or more characteristics of the target document, such as keys, an unique label, or an example page. Typically, a document is provided to the document server and only one page is retained. The retained page can then serve as the example page, to be provided when the entire document is desired. An example page could be the first page of the document, but it need not be the first page, nor even a complete page of the document, so long as the example page (or page portion) could be used to distinguish the target document from the other documents in the document database, or at least to identify a set of candidate matching documents which closely match the target document and can be presented to a user for selection of the target document from among the candidate matching documents.

In one embodiment of a document server according to the present invention, an example page for each document in a document database is processed by a page processor to generate an icon, i.e, an iconic representation, of an example page of the document. Typically, this is done at the time the document is first stored in the document database. The page processor analyzes an example page to segment regions of the example page according to image types, such as text, line art, photographs, other graphics, borders, colored areas, glyphs, bar codes, etc. Of course, not all image types need be found in all example pages and image types are not limited to those mentioned here. Once segmented, each region is characterized and reduced in a manner appropriate for the image type of the region. For example, text in text regions is replaced with a block font (defined below) and reduced, while graphics regions are reduced in resolution (by lowering pixel precision and/or the number of pixels per unit area). The reduced regions of the example page are then reassembled into an icon of the example page.

In a specific application of the present invention, many icons are printed on a single page, referred to herein as a "guide" page. This guide page, or multiple guide pages depending on the number of icons, is provided to a user. To retrieve a document, the user visually scans the guide page to find an icon which is visually associated with the target document and then supplies an indication of the selected icon to the document server. The document server analyzes the contents of the icon to detect distinguishing features of the example page represented by the icon and provides those features to a search engine. The search engine then identifies candidate matching documents in the document database. If more than one candidate matching document is returned, the document server provides information about each candidate, such as a thumbnail image of a portion of the candidate document, so that the user can manually select the target document from the candidate matching documents.

Alternatively, each icon could be assigned an identifying label, such as a unique alphanumeric code or machine-readable bar code, which the user provides to the document server for a lookup of the target document. Although the document server does not need to use the content of the icon image for document retrieval, the content of the icon is nonetheless useful to the user, to provide compact visual cues to the target document. With a guide page, the user can scan many icons quickly. Because of the page reduction process, the distinguishing features of the example documents are preserved over the iconization process, and the icons can be made smaller while still allowing distinguishing features to be distinguishable to the user. Instead of each icon having a unique identifier, the icon might be specified by a unique identifier for the guide page on which it is found and the icon's location (e.g., row/column) on the guide page.

Variations of the above embodiments are envisioned. For example, the document server might be integrated with a digital copier to allow the digital copier to output an entire document in response to a user submitting a guide page with an icon circled. The digital copier would scan the submitted guide page and either extract information from the content of the icon, or extract a guide page identifier and determine the icon's location on the guide page. Where decentralized document servers are used and different guide pages are used by different users for the same documents, the former option of identifying the icon only from the icon contents is the preferred approach. The interface for scanning icons and printing documents could be an ordinary facsimile machine, thus allowing global, remote document retrieval.

In some embodiments, multiple icons might be provided for a document to increase the possibility that the user would find a recognizable portion of the document. This is preferred where the number of guide pages or icons is not critically constrained. Also, if desired, the document server can give the user a choice to retrieve less than all of the target document, such as when the target document is to be printed but the user only requires a few pages of a long document.

In a specific embodiment of the page processor, characters are blocked, interword spaces are identified, and the characters of words are replaced with a line whose length is proportional to the word's length. This is one method a reducing the error rate when extracting word lengths from icons. One advantage to reducing the error rate is that it allows correspondingly smaller icons to be used.

Icons can also be used as a paper interface to eliminate the need for other types of data entry, such as the entry of a selection from a list to retrieve a data element such as a telephone number or electronic mail address, instead of using the icon to identify a document.

A further understanding of the nature and advantages of the inventions herein may be realized by reference to the remaining portions of the specification and the attached drawings.

BRIEF DESCRIPTION OF THE DRAWINGS

FIG. 3 is an illustration of an example page;

DESCRIPTION OF THE PREFERRED EMBODIMENTS

Figure 1:
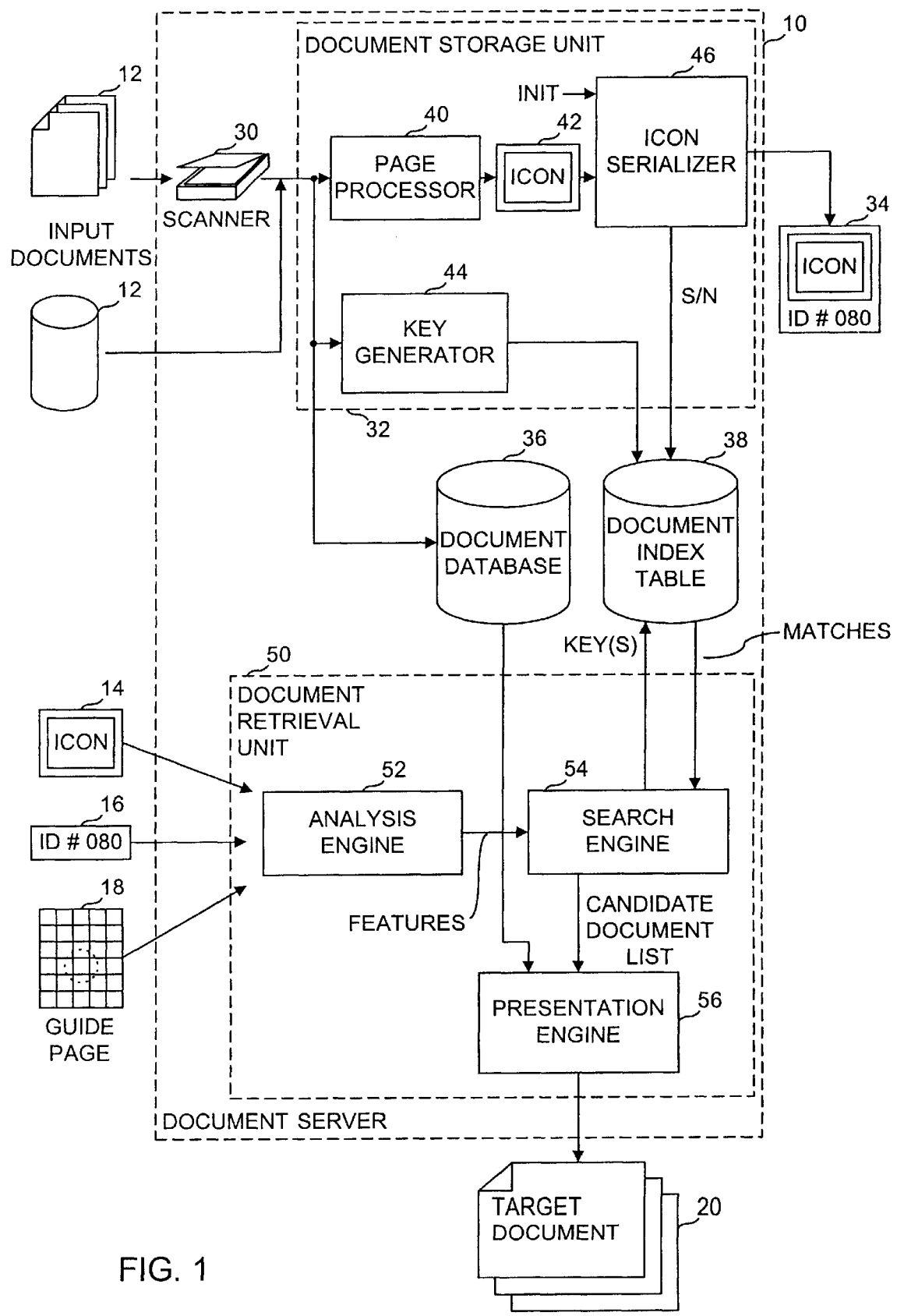
FIG. 1 is a block diagram of a document storage and retrieval system including a page processor.

FIG. 1 shows a document server 10 according to one embodiment of the present invention. Document server 10 accepts input documents, such as input document 12, for storage and responds to user requests for documents. Three user requests are represented in FIG. 1 by an icon 14, a label 16 and a guide page 18, respectively, although other forms of requests are possible including combinations of the requests shown. The user request is a request for a specific document stored by document server 10, such as target document 20 shown in FIG. 1. Document server 10 supplies target document 20 based only on the input request or, if necessary, on further prompting of the user to select among a set of closely matching documents (candidate matching documents). If input documents 12 are paper documents, they are scanned into digital images by a scanner 30 before being provided to a document storage unit 32. Otherwise, if input documents 12 are supplied in electronic form, they are provided directly to document storage unit 32, without the need for scanning. Document storage unit 32 processes an input document 12 and generates an icon 34 for input document 12, places the digital representation of input document 12 into a document database 36 while generating document indexing data to be stored into a document index table 38.

Document storage unit 32 comprises a page processor 40, which generates icons such as icon 42, a key generator 44, and an optional icon serializer 46. Page processor processes an example page taken from document 12 being input to document server 10, to form an icon. This process is described in more detail below. Key generator 44 extracts information from the input document 12 and generates the keys used to locate the document 12 after storage. In some cases, key generator 44 will scan the text of a document 12 if it is a structured document (or will first do character recognition), but will also generate keys based on descriptors as taught by Hull. These generated keys are stored in document index table 38 along with a pointer to the location of document 12 in document database 36.

Where icon identifiers are used, an icon identifier is generated by icon serializer 46 and attached to the icon 42, which is output in a form usable by a document requestor as icon 34. Icon serializer 46 generally increments the number or code used to identify a particular icon, and the number or code is also sent to document index table 38 to be used as a key for the document 12. Icon serializer 46 can be initialized as needed to account for changes in sequences. One use for sequence changing is that each user might maintain a guide page of that user's documents and might desire sequential numbers for that user's icons. In this case, the guide page might be provided as the first page of a scan job, and either page processor 40 or key generator 44 would recognize it as a guide page, extract the serialization of the existing icons and pass that information on to icon serializer 46 so that the next icon could be serialized in order. Of course, the entire guide page can be provided to icon serializer 46 so that icon 42 could be added to the guide page and a new guide page containing icon 42 and all previous icons from that guide page could be printed for the user.

Documents are retrieved from document database 36 by a document retrieval unit 50 of document server 10 which accepts a user request and responds with target document 20. Although user requests are shown in FIG. 1 being provided directly to document retrieval unit 50, the user requests might also be provided remotely, such as over a network or via a facsimile machine. Document retrieval unit 50 is shown with an analysis engine 52, a search engine 54 and a presentation engine 56. Analysis engine 52 is coupled to accept user requests and is coupled to search engine 54 to provide features of the request to the search engine, as explained in more detail below. Search ngine 54, in turn, is coupled to document index table 38 to send keys and receive pointers to matching documents. Search engine 54 is also coupled to presentation engine 56 to send lists of candidate documents (some lists might contain only one document where the keys are sufficient to uniquely identify the target document). Presentation engine 56 is also coupled to document database 36 in order to retrieve documents therefrom, and is coupled to various output devices (not shown), such as a digital copier, a computer display, a printer, a facsimile machine or an electronic mail server.

In operation, the user request is supplied to analysis engine 52. If the user request is in the form of an icon, the analysis engine extracts information from the content of the icon. If the user request is in the form of an icon identifier (icon ID or guide page ID and icon position), then that identifier is the feature used. Analysis engine 52 provides the extracted feature(s) to search engine 54.

Search engine 54 uses the extracted features to generate keys for searching for the target document. Hull teaches the storing of hashed redundant descriptors of a document, which in this case would serve the role of keys. Where an icon identifier is used instead of the icon contents, that identifier is used as the key. The key is used to index into document index table 38 to retrieve a list of one or more matches corresponding to the candidate matching documents. Where an icon identifier is used, there will normally be only one candidate matching document, however is a system where one icon might select for multiple versions of a document, more than one candidate matching document might exist.

Search engine 54 provides the list of matches to presentation engine 56. Presentation engine 56 then retrieves the candidate matching documents from document database 36 and presents them according to presentation instructions provided in the user requests. For example, the user might request to view the document on the computer monitor or request that it be printed. Where a digital copier is used, requesting that the document be printed might be transparent, i.e., the user requests the document and the digital copier assumes that it is to be printed. Presentation engine 56 might also include an interactive interface to allow the user to browse through the candidate matching documents or thumbnails of the candidates, and accept a selection from a keyboard or mouse indicating which is the desired document.

Figure 2:
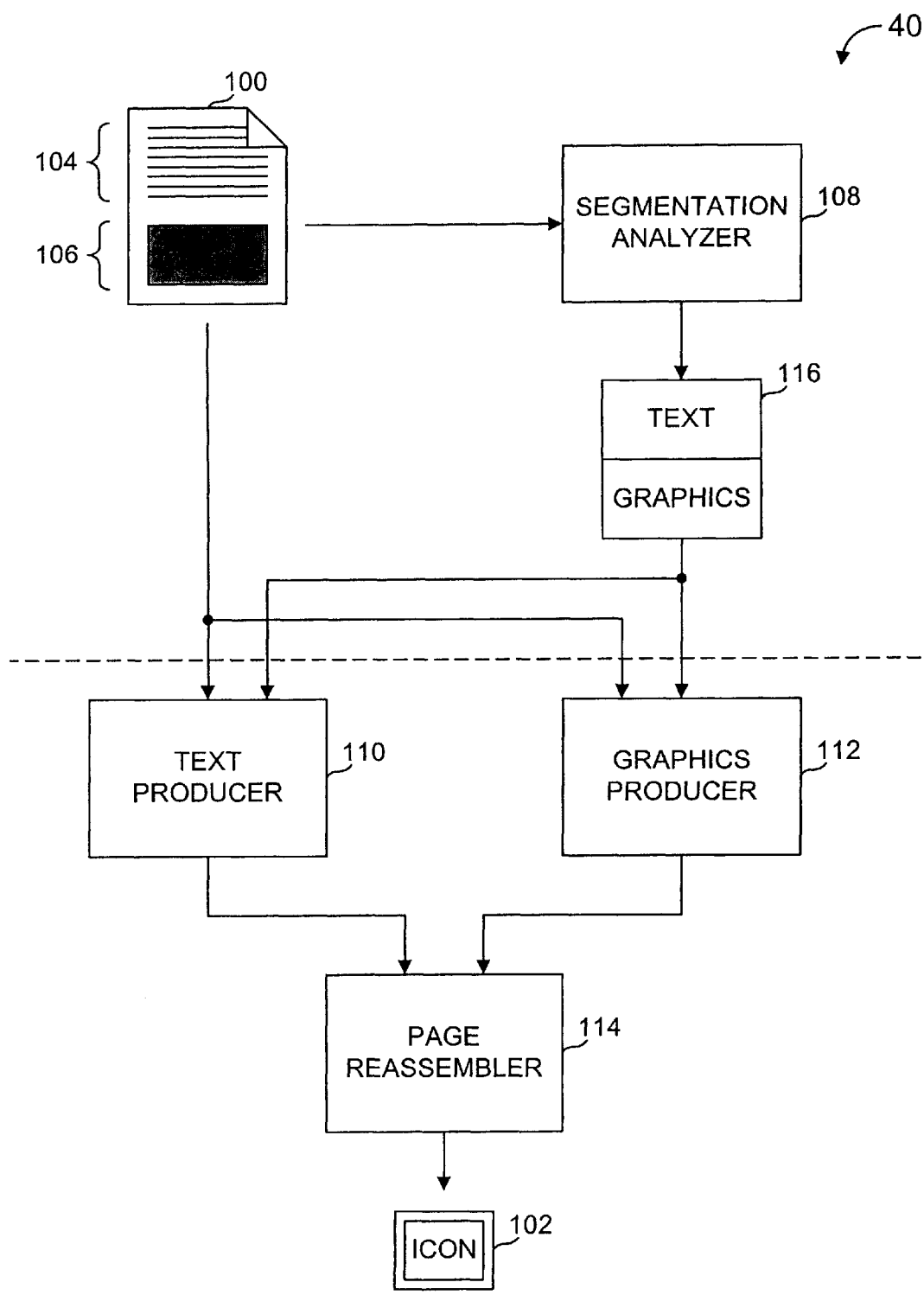
FIG. 2 is a more detailed block diagram of the page processor shown in FIG. 1.

FIG. 2 shows page processor 40 in greater detail. Page processor 40 accepts a digital representation of a page 100 as its input and outputs an icon 102 as the iconic representation of page 100. In the figure, page 100 is shown with a text region 104 and a graphics region 106, and page processor 40 is shown with a segmentation analyzer 108, and text reducer 110, a graphics reducer 112 and a page reassembler 114. Segmentation analyzer 108 produces, from the input page 100, a map 116 of the different regions of page 100, which in this case contains just one text region and one graphics region. Of course, a typical document might contain more complex pages with more varied regions.

Page 100 and map 116 are provided to text reducer 110 and graphics reducer 112. Alternatively, to save transmission time or storage space, page 100 could be separated beforehand into subpages for each type of region found. Either way, the particular reducer operates only on it's region type. While only two reducers are shown, other reducers might also be used. For example, if segmentation analyzer 108 detected a region of glyphs (machine readable marks) or bar codes, a glyph or bar code reducer would be used. That reducer would simply read the information encoded in the glyphs or bar code and generate machine readable marks encoding that information in less area.

Once each of the regions are reduced, they are recombined by page reassembler 114 to form icon 102. One general method of page segmentation is shown by Cullen, J. F., and Ejiri, K., "Weak Model-Dependent Page Segmentation and Skew Correction for Processing Document Images", *Proc. of the 2nd Internat. Conf. on Doc. Anal. and Recog.* 757–60 (1993).

The particular method of reduction is such that a small icon is recognizable to the user, although not necessarily readable, as well as being distinguishable by analysis engine 52 when the icon is user to request a document.

Figure 4:
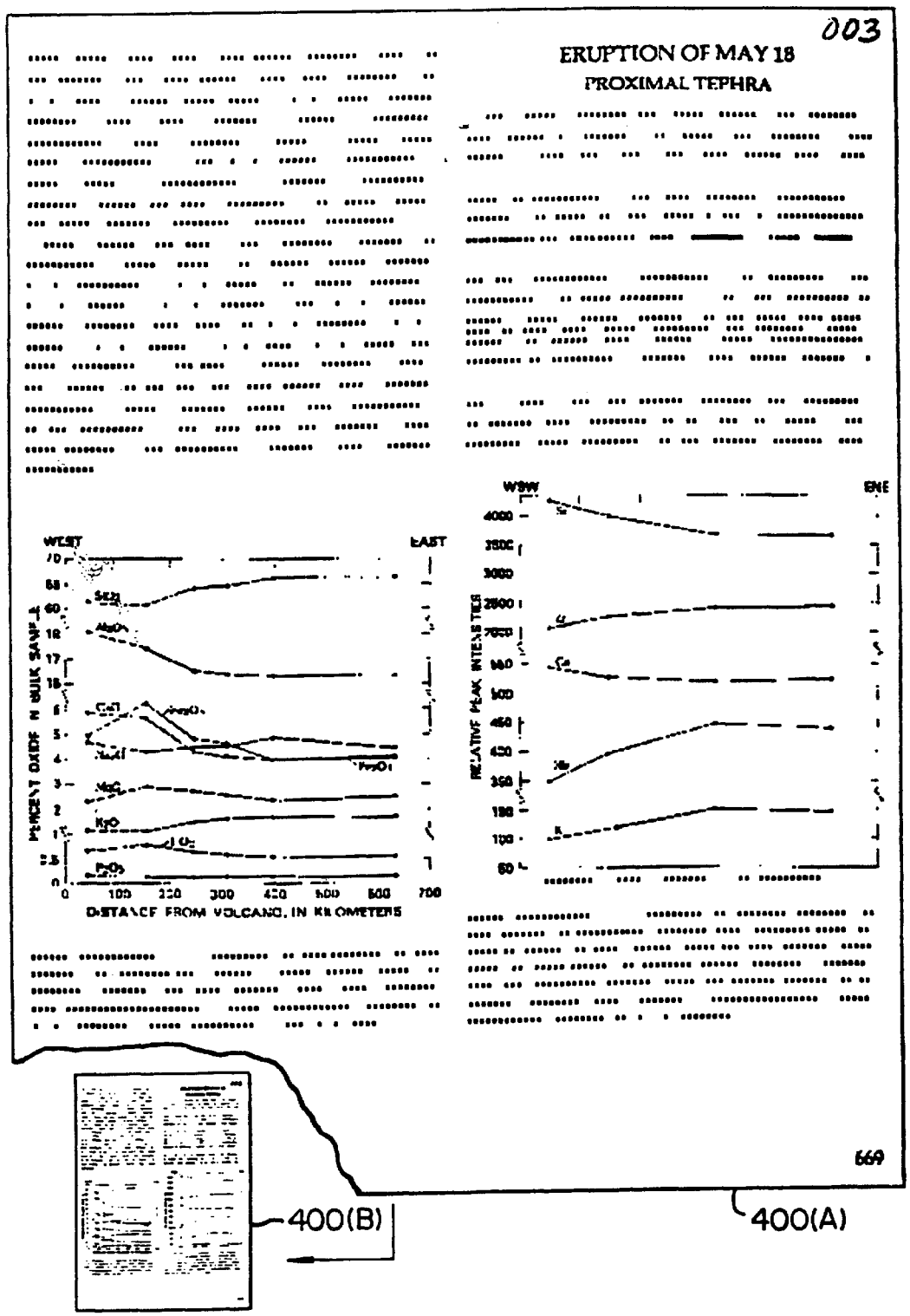
FIG. 4 illustrates an icon representing the example page shown in FIG. 3.

For example, text reducer 110 does not merely reduce the text region. To make the document more differentiable to analysis engine 52, each character in a text region is replaced by a block font character. FIG. 3 shows an example of a page 300 to be iconized. FIG. 4 shows an icon 400 formed from page 300 (icon 400(A) is the icon shown full size; icon 400(B) is the icon shown at a size found in a typical guide page). In FIG. 4, each character is replaced with a block character. While this renders the text unreadable, it does not need to be readable to be recognizable to the user. It also does not need to be readable to analysis engine 52 if the actual characters are not used as features. In Hull, for example, the characters are not used, but the pattern of word lengths in the text are. By replacing characters with blocks as with icon 400, the word lengths are more likely to be preserved through subsequent copying or facsimile transmission of icon 400. The blocks can be generated in several ways. One way, suitable for use with structured documents such as a word processing file, where the image is created by displaying a font character for each representation of a character, is to use a font of blocks. For example, a structured document might have the ASCII code '65' stored therein. A display driver would use that code as an index into a font table and retrieve the character image "A" for display. To generate blocks, the font table could be replaced with character images which are all blocks, except for the space character, of course (and possibly other punctuation). If the page 100 is not represented as a structured document, but is just an image of the page (e.g., a bit map), each character can be bounded by a bounding box and the bounding box filled in. This eliminates the need for an intermediate character recognition step and its accompanying errors.

For even greater reproduceability, the words can be replaced with lines. To do this, the bounding boxes for the characters and interword spaces are determined. The bounding boxes are then spaced evenly and replaced with a line segment. Thus each line of text is replaced with collinear line segments each with a length proportional to the number of characters in the word being replaced.

As a refinement to the process of reduction, segmentation analyzer 108 might separately categorize large font text and small font text. If this is done, the large font text would be processed by a reducer which reduces the text proportionally, with or without character recognition, so the user can still read the large font text when it is reduced. The small font text would be processed by a reducer as explained above to replace characters with blocks or lines.

With multi-color documents, the color might be preserved in the reduction of the example page to an icon.

Another refinement is to place each block character along the text baseline, and to provide a fixed spacing between each block within each word. This can aid the image processing feature detection of the character block pattern.

In one embodiment, if line art is detected, such as in graphics region 106, graphics reducer 112 processes the line art differently than photographic art. Line art is graphics which are relatively well defined and do not use shades of grey. Line art is reduced according to a structure preserving operation such as line thinning to further enhance their identifiability.

Figure 5:
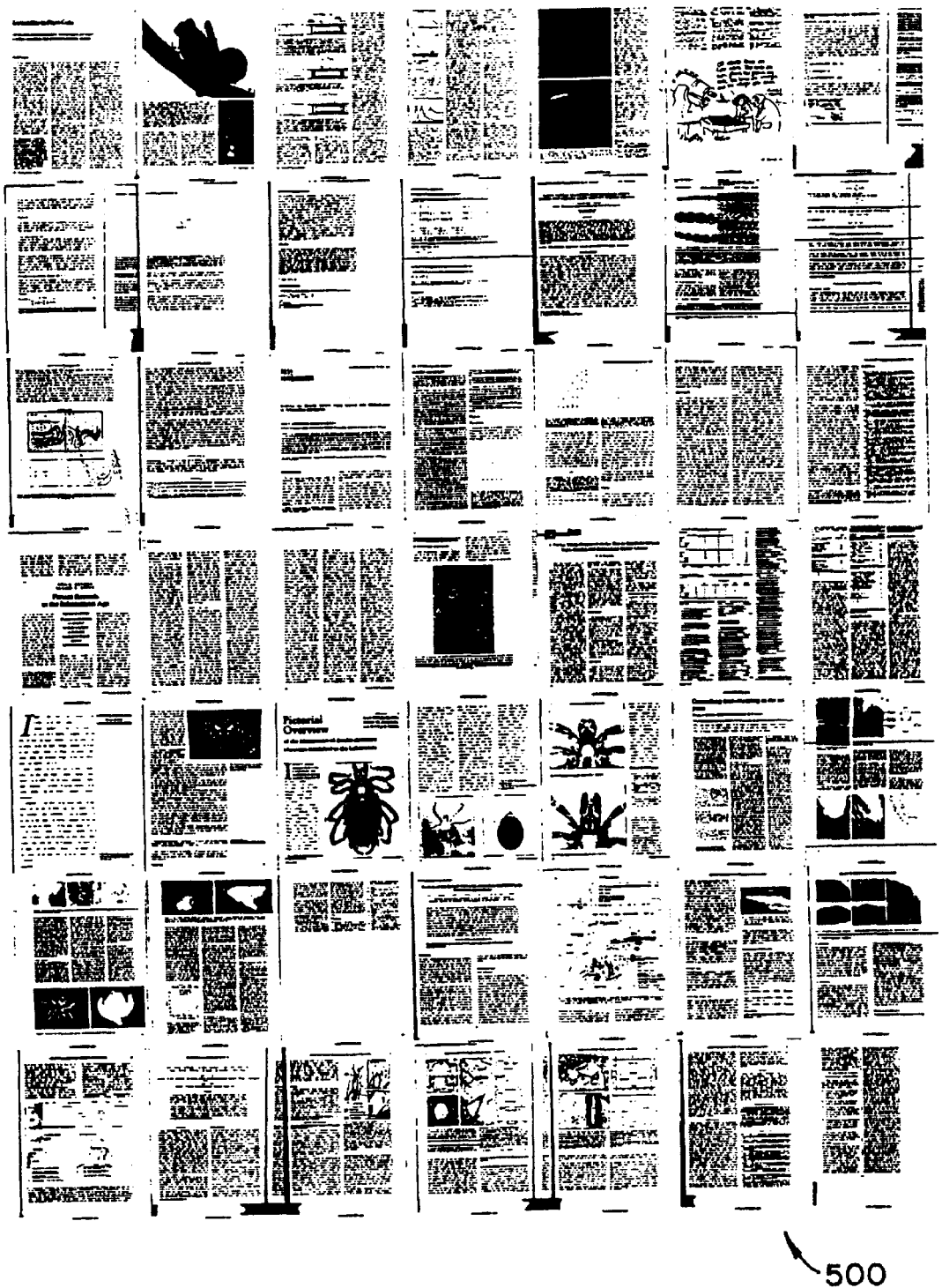
FIG. 5 is an illustration of a guide page which includes the icon shown in FIG. 4.

FIG. 5 is an illustration of the relative size of icons. FIG. 5 shows a guide page 500 containing icons similar to icon 102 and space for 49 icons per guide page (seven rows of seven icons each; 98 icons if double-sided) although icons might be made even smaller. With only ten such double-sided guide pages, a user can scan icons for example pages for nearly 1000 documents, which might total several tens of thousands of pages stored by document server 10. The user need not even maintain the guide pages, if the document server can print out the guide pages on demand. The icons could even be stored with the documents in document database 36 or with the key data in document index table 38.

To retrieve a copy of a document containing page 100, from which icon 102 is derived, a user might just circle icon 102 on guide page 500 and submit the guide page to document server 10. Guide page 500 could also be used for document management. For example, document server 10 might be programmed to accept a guide page with icons "X"ed out to signal that the corresponding documents should be deleted from document database 36. A document server might try to automatically distinguish guide pages from other pages by doing a test retrieval of a document from what appears to be an icon. If a document is retrieved in such a manner, the page is assumed to be a guide page.

Figure 6:
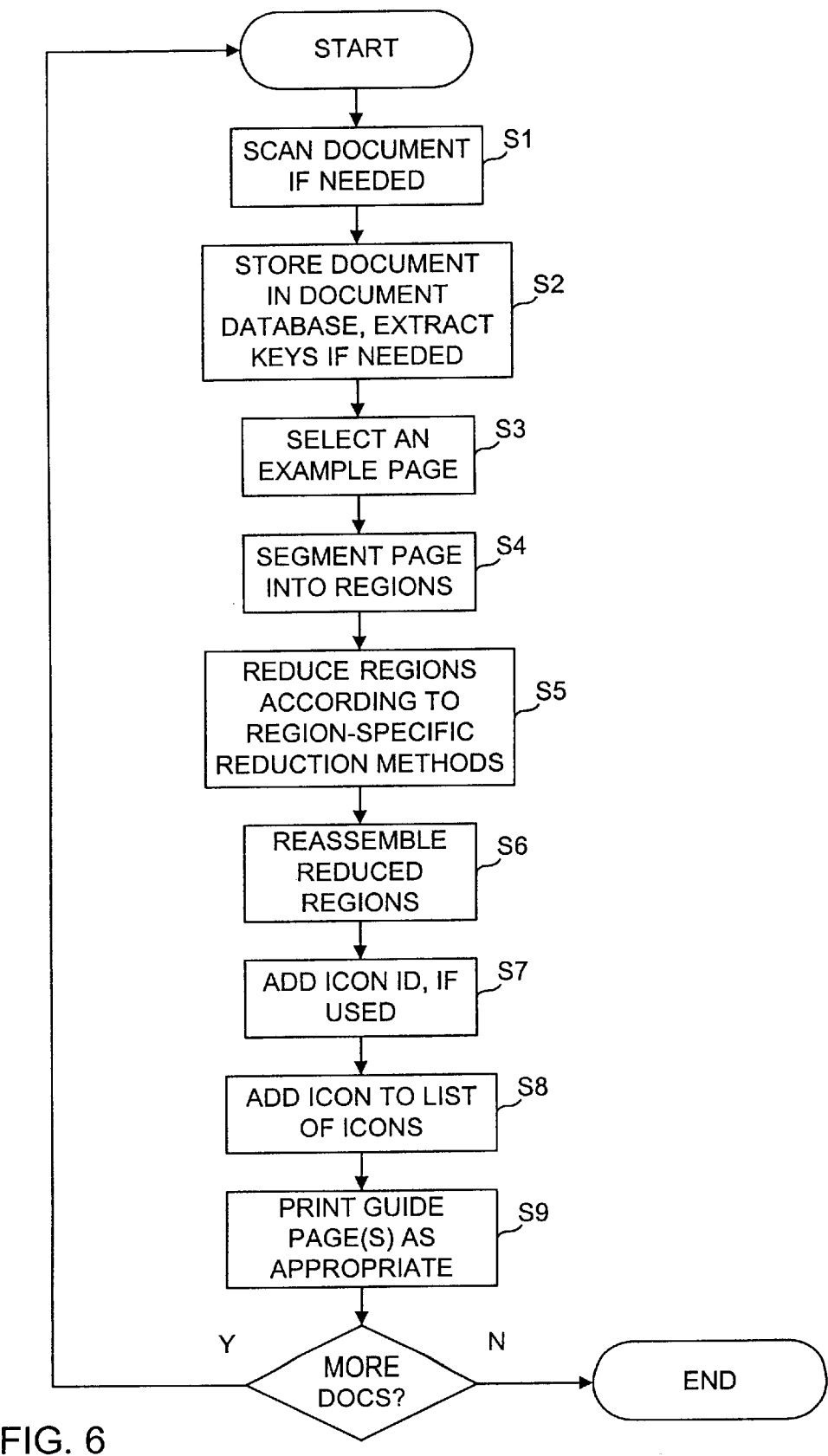
FIG. 6 is a flow chart of a process for storing documents in a document database including the creation of paper guide pages.

FIG. 6 is a flow chart of a process for storing documents in a document database according to the present invention. The process begins when a user presents documents to a document server. In step S1, a document is scanned if it is not already in electronic form. In step S2, the document is stored in a document database and keys are extracted from the document, if used. As explained above, one method of extracting redundant features for use as keys is taught by Hull. Next, an example page is selected from the document to be used for icon generation (S3). If the selection of an example page is automatic, the document server might always select the first page of the document, examine the pages of the document to locate rarely found features, such as graphs in a database of mostly text documents or choose to have all pages selected. Otherwise, the selection of a memorable example page can be made by the user.

Once the example page is selected, the example page is segmented to form a map, or layout, of the regions of the example page (S4). Each of these segments are reduced according to reduction processes specific to the image type of the region (S5), and the reduced regions are then reassembled into an electronic representation of the icon (S6). If an icon ID is used, it is added to the electronic representation (S7).

The electronic icon is added to the other electronic icons associated with a guide page for the icons (S8) and a guide page with the icon is printed as needed (S9). A guide page is typically not printed after each icon, but is printed when the process of document entry is complete or when a guide page is full.

Once the icon is either printed or stored with other icons for later printing, the document server checks for more documents (S10). If more documents are to be processed, the process continues back at step S1, otherwise the process of document storage ends.

Figure 7:
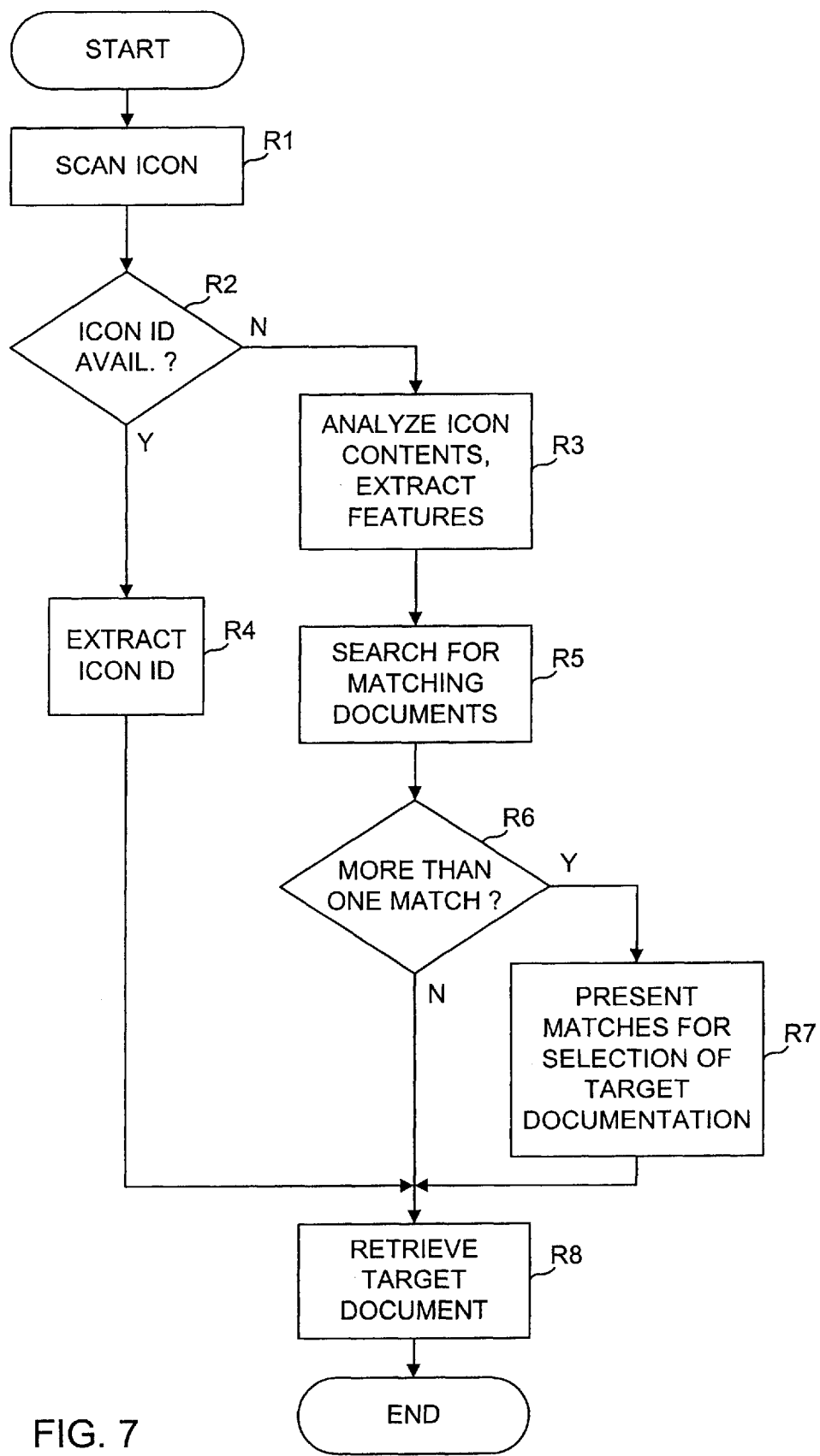
FIG. 7 is a flow chart of a process for retrieving a document from a document database using a guide page.

FIG. 7 is a flow chart of the process for retrieval of documents stored according to the process shown in FIG. 6. The retrieval process begins when a user presents an icon to the document server where the icon represents an example page of a target document to be retrieved and the icon is scanned (step R1). Next, in step R2, the document server determines whether an icon identifier is available from the scanned image of the icon (either an icon specific identifier or a guide page identifier and an icon location on the guide page). If the application allows for different guide pages to be used on different systems, the document server might also check to see if the icon identifier is valid for the system on which it is used. The document server might also use the content of the icon itself as a cross reference to verify that the icon identifier is correct.

If the icon identifier is not present or used, the document server analyzes the icon contents as described above to extract features used by the search engine to search for matching documents (R3). If the icon identifier is used, the icon identifier is extracted and provided to the search engine (R4). In either case, the search engine searches for the target document (R5), and checks to see if more than one matching document was found (R6). If more than one document was found, the user is presented with indications of the matching documents and asked to select the target document from among them (R7). Once a single document is selected, it is returned as the target document (R8).

In this way, users can easily store and extract documents from a document server using just a few guide pages of icons. In view of the above description of the document server, several applications and uses are suggested. For example, a user might provide documents to a digital copier/scanner which is part of a document server system. The documents could then be scanned and the original pages of the documents are erased and recycled, and the user supplied with a guide page containing icons for the documents (not necessarily in a one-to-one relationship).

Although it is not necessarily the preferred embodiment, the icons could be electronically stored in the document server and a guide page could then be printed out on request. If the icons are electronically stored, then it is a simple matter to print out updated guide pages as new icons are added. However, the advantage of having a portable guide page is lost where the user relies solely on the document server to print out a guide page each time a document is to be retrieved. The document server might also provide a guide page update facility, where a user submits a guide page, which is scanned and recycled and a new guide page is printed.

When the user desires to retrieve or delete a document, the user circles (for retrieval) or crosses out (for deletion) the appropriate icons on the guide page, possibly with a pen having machine detectable ink. Alternatively, a small hand-held scanner could be used to scan single items. The document server then locates the relevant documents and takes the appropriate action, either deleting them or presenting them to the user. Instead of retrieving entire documents, of course, the user could indicate the specific pages desired.

With a stable set of icons on a guide page, a user would become more comfortable and familiar with the layout and location of the icons, thus leading to a user being able to quickly locate a document by remembering the location of the icon on the guide page and immediately identifying it.

Icons can also be used as a paper interface to eliminate the need for other types of data entry. For example, an iconic guide page might include icons for a list of people, each showing their name and picture. To use the guide page, the user would circle one of the images and document server 10 would return a set of information associated with that icon. In a specific application, the guide page shows all the individuals in an work group and the guide page with an icon circled is provided to document server 10 to indicate who the document is to be routed to. Thus, the document server would identify the user from a list of users using either an icon identifier or the contents of the icon, look up a network or electronic mail address for the destination user and send the document to that destination.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method of routing a document electronically, comprising the steps of:

generating a plurality of destination icons to form a guide page, wherein a destination icon is a representation of a specific destination;

selecting at least one destination icon from said guide page;

marking said selected destination icon;

extracting at least one feature of said selected destination icon;

using said extracted feature to electronically identify at least one electronic address of said specific destination correspondinf to said extracted freature; and electonically routing said document to said electronic address.

2. The method of claim 1, wherein said specific destinations correspond to specific people.

3. The method of claim 1, wherein said specific destinations correspond to specific groups of people.

4. The method of claim 1, wherein said destination icons are comprised of destination symbols.

5. The method of claim 1, wherein said destination icons are comprised of pictures and names.

6. The method of claim 1, further comprising the step of entering said selected destination icon into a document server system prior to said extraction step.

7. The method of claim 6, wherein said entering step further comprises the step of scanning, said selected destination icon.

* * * * *